United States Patent [19]
Meyer

[11] Patent Number: 6,000,223
[45] Date of Patent: Dec. 14, 1999

[54] METHOD AND APPARATUS FOR PRODUCTION OF HEAT AND/OR MAGNETIC FIELD THROUGH PHOTON OR POSITRON INFUSION

[76] Inventor: Michael S. Meyer, 850 Washburn Ave. apt. 352, Louisville, Ky. 40222

[21] Appl. No.: 09/157,915

[22] Filed: Sep. 21, 1998

[51] Int. Cl.$^6$ .............................. F01K 1/04; G21D 1/00
[52] U.S. Cl. ............................................. 60/643; 60/203.1
[58] Field of Search .................................. 60/203.1, 643; 219/85.12; 264/482

[56] References Cited

U.S. PATENT DOCUMENTS

| | | |
|---|---|---|
| 3,668,546 | 6/1972 | Schumacher . |
| 4,036,012 | 7/1977 | Monsier . |
| 4,426,843 | 1/1984 | Fowler et al. . |
| 4,612,646 | 9/1986 | Zerr . |
| 4,644,169 | 2/1987 | Hunt . |
| 4,658,155 | 4/1987 | Heath . |
| 5,542,247 | 8/1996 | Bushman . |

*Primary Examiner*—Noah P. Kamen
*Attorney, Agent, or Firm*—Michael I Kroll

[57] ABSTRACT

A method and device for producing heat and magnetic field through photon or particle infusion. The device includes a sealed cylinder including a side wall having a mirrored inner side and a recess extending through and tangentially to said side wall providing access to the inner side. An induction tube is connected to and extends from the side wall providing a passageway for a stream of particles to the recess. A lens is positioned at an end of the induction tube opposite the connection with the cylinder and source of the stream of particles is positioned outside and aligned with the induction tube. When the source is activated to direct the stream of photons or particles through the induction tube and recess into the cylinder, the source of particles is reflected off the mirrored inner side causing the particles in said stream to infuse and release heat. As the particles infuse, the density of the particles within the cylinder increases thereby increasing the number of cycled infusions and amount of heat produced. The heat may be used to produce steam for powering an steam turbine and also produce electrical energy through magnetic induction.

19 Claims, 17 Drawing Sheets

| FIG 1A |
|---|
| FIG 1B |
| FIG 1C |

FIG 1

S2 — SELECT OR MANUFACTURE A MATERIAL WITH HIGH REFRACTIVE ABILITIES, SUCH AS METAL, GLASS OR CERAMICS.
FIG 2

S4 — FINISH ONE SIDE OF THE MATERIAL BY MEANS OF POLISHING OR COATING INTO A MIRRORED SURFACE.
FIG 3

S6 — SHAPE THE SELECTED MATERIAL INTO A CLOSED CYLINDER OR SPHERE, THE REACTOR CHAMBER, WITH THE MIRRORED SURFACE ON THE INTERIOR
FIG 4    FIG 5

S8 — CREATE AN OPENING, THE BEAM INDUCTION ORIFICE, TANGENT TO THE REACTOR CHAMBER.
FIG 6    FIG 7

S10 — CREATE AN ELONGATED CHAMBER, THE INDUCTION TUBE, EITHER CYLINDRICAL OR RECTANGULAR, OPEN AT ITS OPPOSING ENDS.
FIG 8

S12 — ATTACH THE INDUCTION TUBE OVER THE BEAM INDUCTION ORIFICE BY MEANS OF BOLTING OR WELDING, TO THE EXTERIOR OF AND TANGENT TO THE REACTION CHAMBER.
FIG 9

FIG 1A

S14 — AT THE OPPOSING END OF THE INDUCTION TUBE, ATTACH A SUITABLE MATERIAL SUCH AS QUARTZ OR GLASS, THE INDUCTION PORT LENS, WHICH WILL PROVIDE FOR A CLOSED SYSTEM WHERE PHOTON AMPLIFICATION CAN OCCUR.
FIG 10   FIG 11

S16 — PLACE A CONDENSED LIGHT SOURCE, SUCH AS A LASER, OUTSIDE OF THE INDUCTION TUBE AT THE INDUCTION PORT LENS.
FIG 12

S18 — ALIGN THE LASER SO THAT ITS BEAM WILL TRAVEL DOWN THE INDUCTION TUBE AND THROUGH THE BEAM INDUCTION ORIFICE INTO THE REACTION CHAMBER ON TANGENT SIDE.

S20 — TURN ON THE LASER, A STREAM OF PHOTONS WILL BE INJECTED INTO THE REACTION CHAMBER.
FIG 13

S22 — THE MIRRORED SURFACE OF THE REACTION CHAMBER WILL FORCE THE BEAM BACK INTO ITSELF SEVERAL THOUSAND TIMES WITHIN THE FIRST FEW MICRO SECONDS OF THE BEAM DURATION CREATING AN EXTREME DENSITY OF PARTICLES OR PHOTONS WITHIN THE CHAMBER.
FIG 14

S24 — THE COLLISION OF THE PHOTONS BETWEEN EACH OTHER WILL RELEASE A QUANTITY OF ENERGY IN THE FORM OF HEAT. BY MEANS OF CONVECTION AND CONDUCTION THE HEAT WILL BE INDUCED INTO THE WALLS OF THE REACTION CHAMBER WHERE IT CAN BE HARVESTED BY AN APPLICABLE APPLICATION.

FIG 1B

METHOD AND APPARATUS FOR PRODUCTION OF HEAT AND/OR MAGNETIC FIELD THROUGH PHOTON OR POSITRON INFUSION

BACKGROUND OF THE INVENTION

1. Field of the Invention

The present invention relates generally to energy conversion and, more specifically, to the generation of heat and electrical energy by the conversion of potential energy from the infusion of moving particles or photons forming a laser or particle beam and by increasing the density of the particles forming the laser beam within a cylinder having a mirrored inner side by reflecting the particles forming the laser or particle beam within the cylinder.

2. Description of the Prior Art

Numerous types of methods and devices for the conversion of energy have been provided in the prior art. For example, U.S. Pat. Nos. 3,668,546; 4,036,012; 4,426,843; 4,612,646; 4,644,169; 4,658,115 and 5,542,247 all are illustrative of such prior art. While these units may be suitable for the particular purpose to which they address, they would not be as suitable for the purposes of the present invention as heretofore described.

U.S. Pat. No. 3,668,546

Inventor: Edward R. Schumacher

Issued: Jun. 6, 1972

A laser stimulator assembly particularly suited for exciting a laser from an external position. An elongate source of laser excitation energy is positioned at the focal axis of an ellipsoidal reflector and together with cylindrical retro-reflectors and two extending plane reflectors directs the maximum amount of laser excitation energy to an elongate aperture with the minimum loss by reason of multiple reflections. The ellipsoidal reflector and the retro-reflectors are positioned within a fluid-tight enclosure comprising a body member and two end members. Communication to the inside of the fluid-tight enclosure is provided through its end members for connection of the source of actuating energy. The same communication means in the form of an electrical conductor may, in the preferred embodiment, be hollow, providing a fluid path through the end members for circulating a cooling medium through the interior of the assembly and in contact with the elongate source of laser excitation energy to increase its efficiency. The cooling medium is preferably a selected fluid having desirable light transmissive and heat conduction properties, as well as being electrically non-conductive.

U.S. Pat. No. 4,036,012

Inventor: Michael J. Monsler

Issued: Jul. 19, 1977

Optics capture and concentrate laser radiation and send it through a gas dynamic window which is formed by supersonic expansion of unseeded hydrogen gas exiting a passageway directly under the opening. Seeded fuel is inserted into the chamber where it is heated by the laser radiation and the energy of the heated gas is converted into kinetic energy of a high velocity by means of a rocket nozzle.

U.S. Pat. No. 4,426,843

Inventor: Michael C. Fowler et al.

Issued: Jan. 24, 1984

An improved energy conversion device for converting the energy carried by a laser beam to kinetic energy of a working fluid transparent to the laser radiation incorporates a seed gas having a relatively low dissipation temperature. The beam is focused to a beam spot the maximum diameter of which depends on the total power of the beam.

U.S. Pat. No. 4,612,646

Inventor: Bruce A. Zerr

Issued: Sep. 16, 1986

The invention relates to an improvement in gas lasers and a method of operating the same. In one aspect, the invention is an improved method for operating a high power gas laser. The improvement comprises introducing the gas lazing medium tangentially to the laser tube at a pressure establishing a forced vortex in the tube. The vortex defines an axially extending core region characterized by a low pressure and temperature relative to the gas inlet and the exterior of the vortex. An electrical discharge is established in the core region to initiate lazing of the gas. The gas discharge from the tube is passed through a diffuser. As in conventional gas lasers, firing results in a very abrupt increase in gas temperature and in severe disruption of the gas. However, the gas vortex almost immediately restores the gas to its pre-firing condition. That is, almost all of the waste heat is transferred radially to the laser wall, and the original gas-flow pattern is restored. As a result, the power output of the laser is increased significantly, and the laser firing repetition rate is markedly increased.

U.S. Pat. No. 4,644,169

Inventor: Stanley E. Hunt

Issued: Feb. 17, 1987

Apparatus is disclosed herein, for converting laser energy to thermal energy for a variety of purposes, which includes a conical laser beam collector for gathering or receiving impinging beams or rays that has a plurality of coaxially disposed annular shoulders arranged either along the external or internal surfaces of the collector adapted directly to receive the laser beams or rays. A liquid circulating system includes a cylinder housing the conical collector having a plurality of coaxial coils arranged about its internal coiled spiral carried on the conical collector. The liquid circulating system serves as a heat exchanger to convert the heat gathered by the conical collector into superheated liquid carried by the liquid circulating system for ultimate use in prime mover or generator applications.

U.S. Pat. No. 4,658,115

Inventor: Vernon Heath

Issued: Apr. 14, 1987

A method and apparatus for producing vapor from a liquid using laser energy are disclosed. Liquid within a container is vaporized by directing at least one laser beam into the liquid in the container and retaining at least essentially all of the energy of the at least one laser beam in the container for vaporizing the liquid. The container is a boiler of a high pressure steam generator in the illustrated embodiment.

U.S. Pat. No. 5,542,247

Inventor: Boyd B. Bushman

Issued: Aug. 6, 1996

A method and apparatus are provided for converting energy into thrust, and directing the thrust to move an object.

The apparatus includes a chamber having air disposed therein, a pulsed laser for converting an energy source into light pulses, and a lens for receiving the light pulses and directing the light pulses toward a focal point within the chamber. Each light pulse converges in a region which is proximate to the focal point and causes molecules within the air which are at the region to disassociate. Disassociation of the molecules generates pressure waves which provide thrust for powering the object to move.

SUMMARY OF THE PRESENT INVENTION

The present invention relates generally to energy conversion and, more specifically, to the generation of heat, magnetic field and electrical energy by the conversion of potential energy from the infusion of moving particles or photons forming a laser or particle beam and by increasing the density of the particles forming the laser or particle beam within a cylinder having a mirrored inner side by reflecting the particles forming the laser or particle beam within the cylinder.

A primary object of the present invention is to provide a method and device for producing heat and magnetic field through photon or positron, etc. infusion that will overcome the shortcomings of prior art devices.

Another object of the present invention is to provide a method and device for producing heat and magnetic field through photon or positron, etc. infusion which is able to use the generated heat to produce steam.

A further object of the present invention is to provide a method and device for producing heat and magnetic field through photon or positron, etc. infusion which is able to use the generated heat to produce electrical energy via conversion or magnetic induction.

A yet further object of the present invention is to provide a method and device for producing heat and magnetic field through photon or positron, etc. infusion wherein the laser or particle beam is directed into a cylinder having a reflective inner side causing the laser or particle beam to reflect back into itself creating a high concentration of photons/positrons or particles within the cylinder.

A still further object of the present invention is to provide a method and device for producing heat and magnetic field through photon or positron, etc, infusion including an induction tube through which the laser or particle beam is injected into the reflective cylinder.

A further object of the present invention is to provide a method and device for producing heat and magnetic field through photon or particle infusion wherein the laser or particle beam continually reflects back against the walls of the cylinder causing the photon population to multiply via particle infusion.

A still further object of the present invention is to provide a method and device for producing heat and magnetic field through photon, positron, etc. particle infu sion wherein the multiplication of the photon or positron population increases the photon density within the cylinder creating intense heat and magnetic field which may be harnessed and converted to steam for turning turbines and/or powering an electrical energy generator or charging electrical coils through magnetic induction.

Another object of the present invention is to provide a method and device for producing heat and magnetic field through photon or particle infusion that is simple and easy to use.

A still further object of the present invention is to provide a method and device for producing heat and magnetic field through photon or particle infusion that is economical in cost to manufacture.

Additional objects of the present invention will appear as the description proceeds.

A method and device for producing heat and magnetic field through photon or particle infusion is disclosed by the present invention. The device includes a sealed cylinder including a side wall having a mirrored inner side and a recess extending through and tangentially to said side wall providing access to the inner side. An induction tube is connected to and extends from the side wall providing a passageway for a stream of particles to the recess. A lens is positioned at an end of the induction tube opposite the connection with the cylinder and source of the stream of particles is positioned outside and aligned with the induction tube. When the source is activated to direct the stream of photons or particles through the induction tube and recess into the cylinder, the source of particles is reflected off the mirrored inner side causing the particles in said stream to infuse and release heat. As the particles infuse, the density of the particles within the cylinder increases thereby increasing the number of cycled infusions and amount of heat and magnetic field produced. The heat may be used to produce steam for powering an steam turbine and also produce electrical energy or direct electricity through magnetic induction.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

FIGS. 1A–C is a flow chart describing the method for production of the device for producing heat and magnetic field through photon or particle infusion of the present invention;

Figure 12:
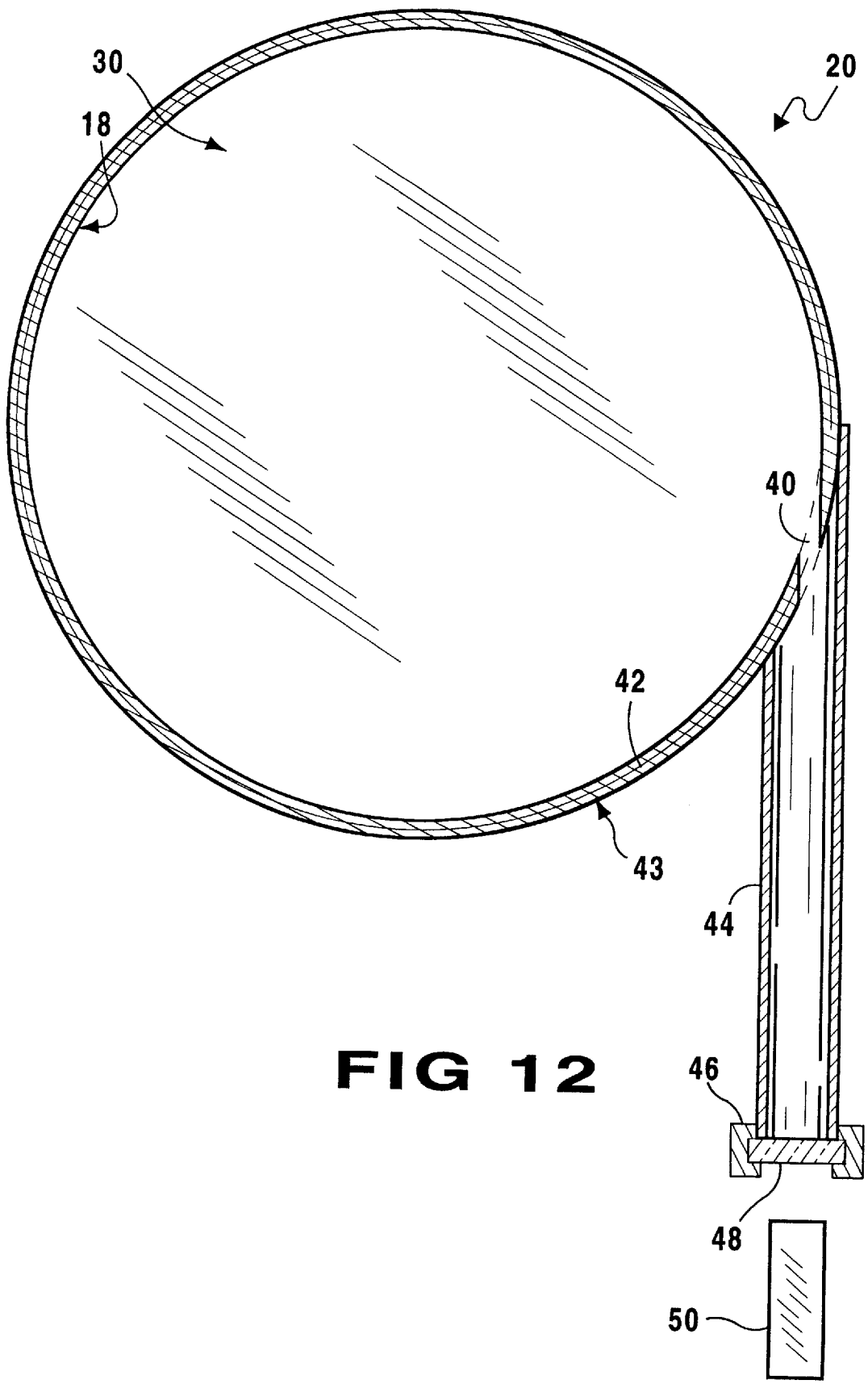
FIG. 12 is a cross-sectional view of the cylinder and induction tube connected together with the condensed light source positioned at an entrance to the induction tube for use with the method and device for producing heat and magnetic field through photon or particle infusion of the present invention.
Figure 15:
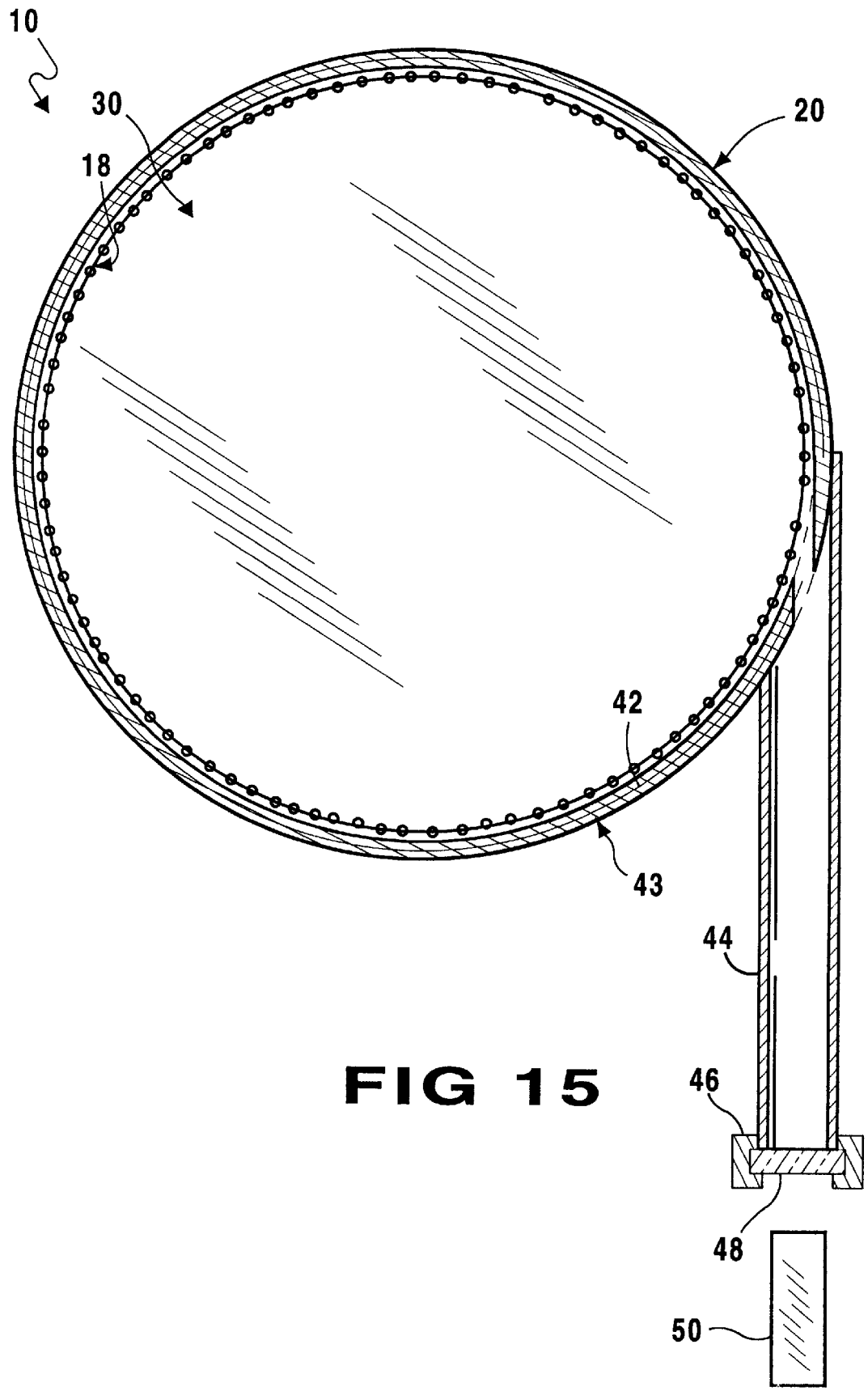
Figure 16:
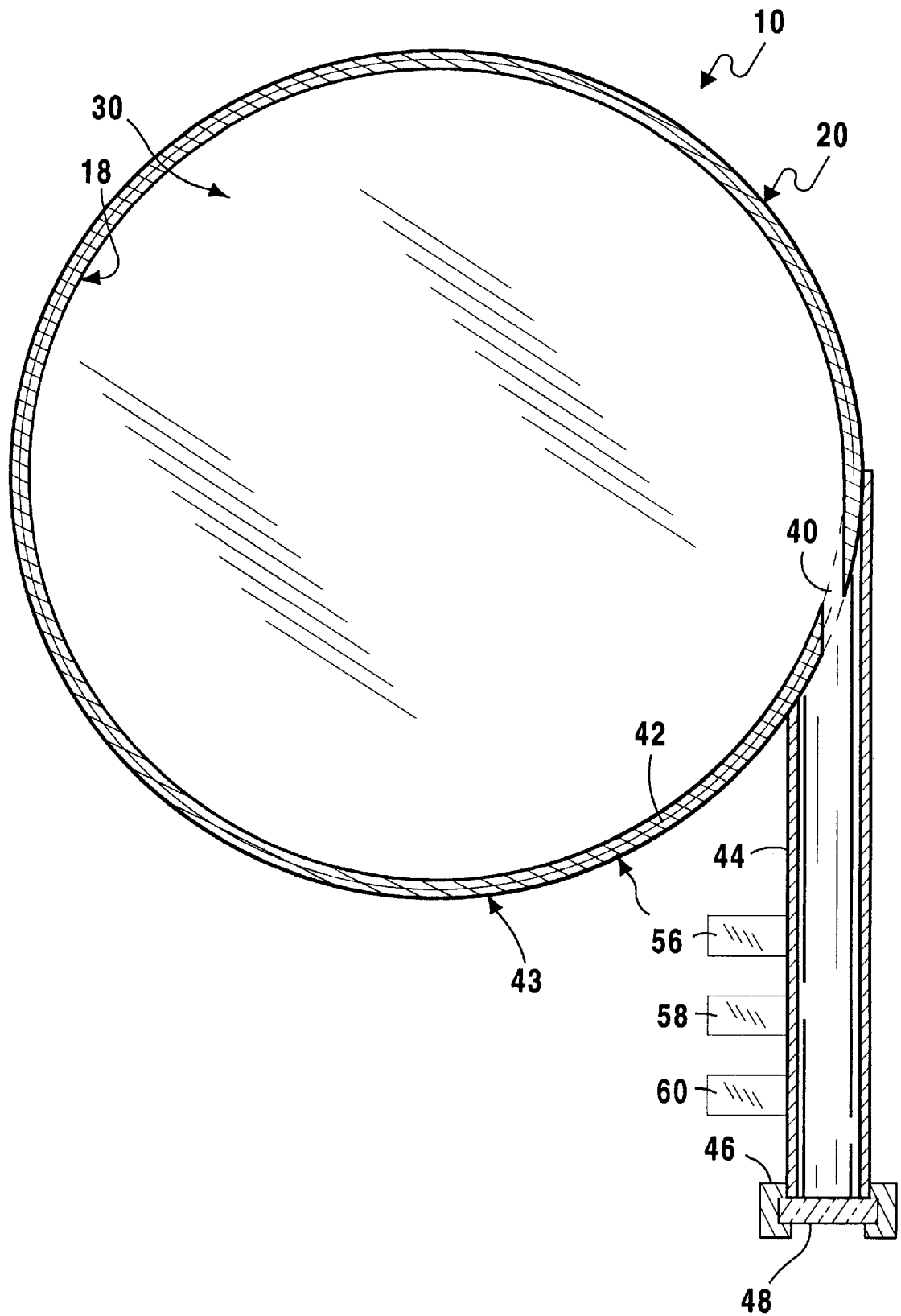

FIG. 15 is a cross-sectional view as shown in FIG. 12 of the method and device for producing heat and magnetic field through photon or particle infusion of the present invention illustrating the stream of photons colliding to increase the density of particles within the chamber; and FIG. 16 is a cross-sectional view of an alternate embodiment of the method and device for producing heat and magnetic field through photon or particle infusion of the present invention including additional ports in the induction tube for the entry of other sources of gas.

DESCRIPTION OF THE REFERENCED NUMERALS

Turning now descriptively to the drawings, in which similar reference characters denote similar elements throughout the several views, the Figures illustrate the method and device for producing heat and magnetic field through photon or particle infusion of the present invention. With regard to the reference numerals used, the following numbering is used throughout the various drawing figures.

10 device for producing heat and magnetic field through photon or particle infusion of the present invention
12 material used to form cylinder
14 upper reflective surface of material
16 lower surface of material
18 mirrored surface of material
20 cylinder formed by material
21 arrows representing rolling of material to form cylinder
22 seam in cylinder
24 first end of material
26 second end of material
28 top cover for cylinder
30 bottom cover for cylinder
32 first open end of cylinder
34 second open end of cylinder
36 arrows indicating movement of top cover to seal first open end
38 arrows indicating movement of bottom cover to seal second open end
40 opening formed in cylinder for introduction of laser or particle beam
42 wall of top cover
43 skirt extending from top cover
44 induction tube
46 first end of induction tube
48 lens positioned at first end of induction tube
50 source of photons or particles
52 photon or particle stream
54 photons or particles infusing within cylinder
56 vacuum port
58 bathing gas port
60 laserable gas (or quantum fuel) port

DETAILED DESCRIPTION OF THE PREFERRED EMBODIMENT

Turning now descriptively to the drawings, in which similar reference characters denote similar elements throughout the several views, FIGS. 2 through 16 illustrate the device for producing heat and magnetic field through photon or particle infusion of the present invention indicated generally by the numeral 10.

Figure 1C:
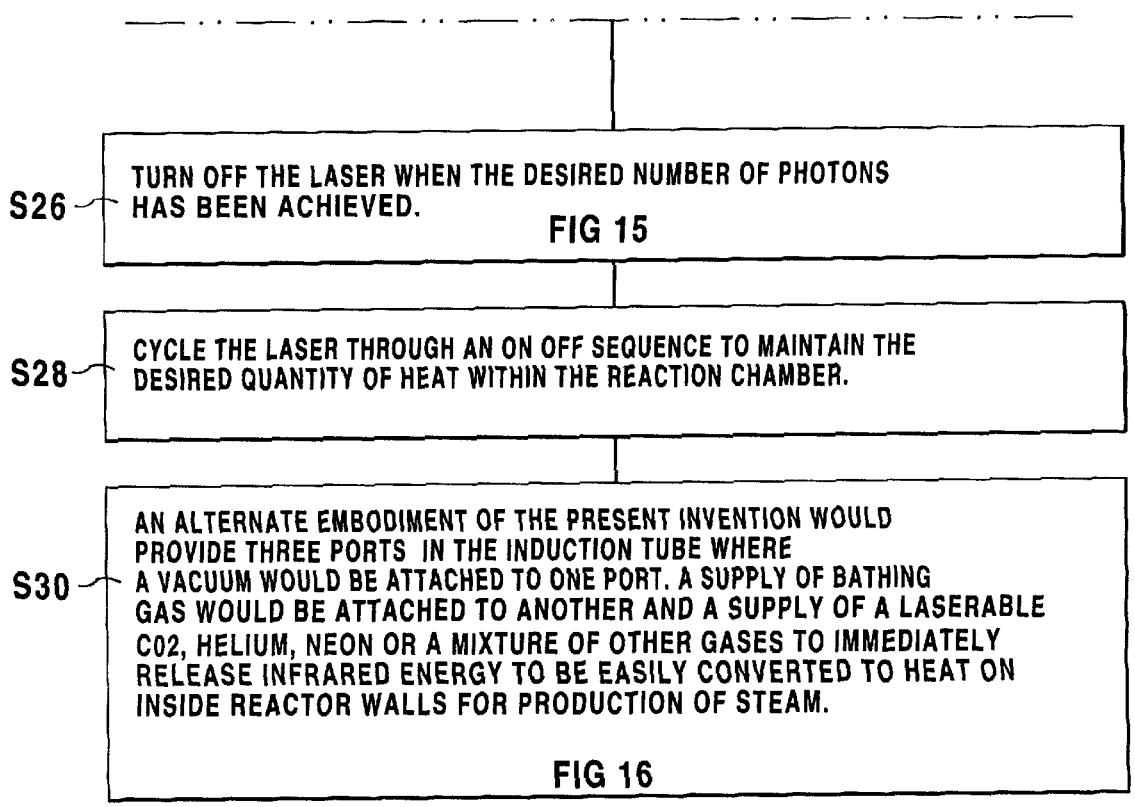
Figure 2:
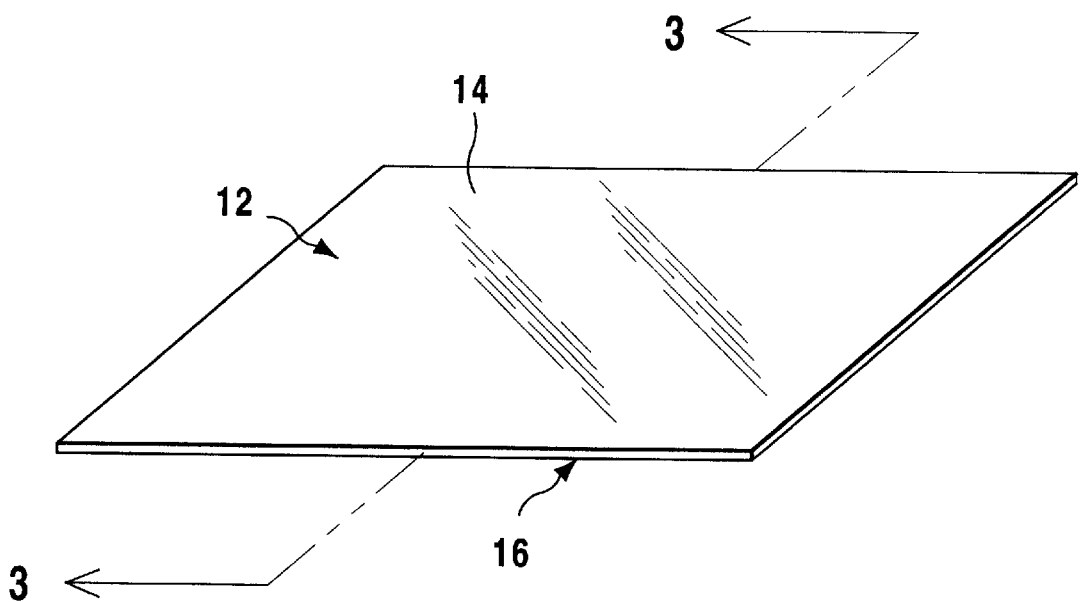
FIG. 2 is a top perspective view of the material used to create the cylinder including the reflective inner surface for use with the method and device for producing heat and magnetic field through photon or particle infusion of the present invention.
Figure 3:
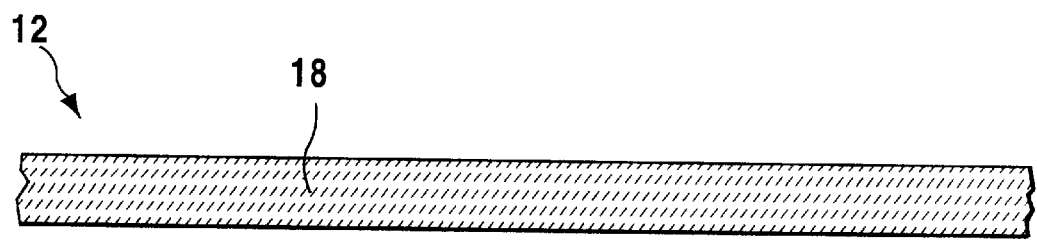
FIG. 3 is a top view of the material used to create the cylinder including the reflective inner surface with the reflective surface polished for use with the method and device for producing heat and magnetic field through photon or particle infusion of the present invention.

The device for producing heat and magnetic field through photon or particle infusion 10 is illustrated in FIGS. 2–16 showing the formation of the device in a progressive fashion with a corresponding description of the formation and method of use in FIG. 1. FIG. 2 illustrates a flat piece of material 12 having highly refractive properties. The material 12 is used to form a cylinder as will be explained hereinafter. The material 12 used is preferably formed from at least one of metal, glass, ceramic, any metal alloy and any combination thereof. The material 12 has an upper reflective surface 14 and a lower surface 16. The upper reflective surface 14 is polished or coated to form a mirrored surface 18 as illustrated in FIG. 3.

Figure 4:
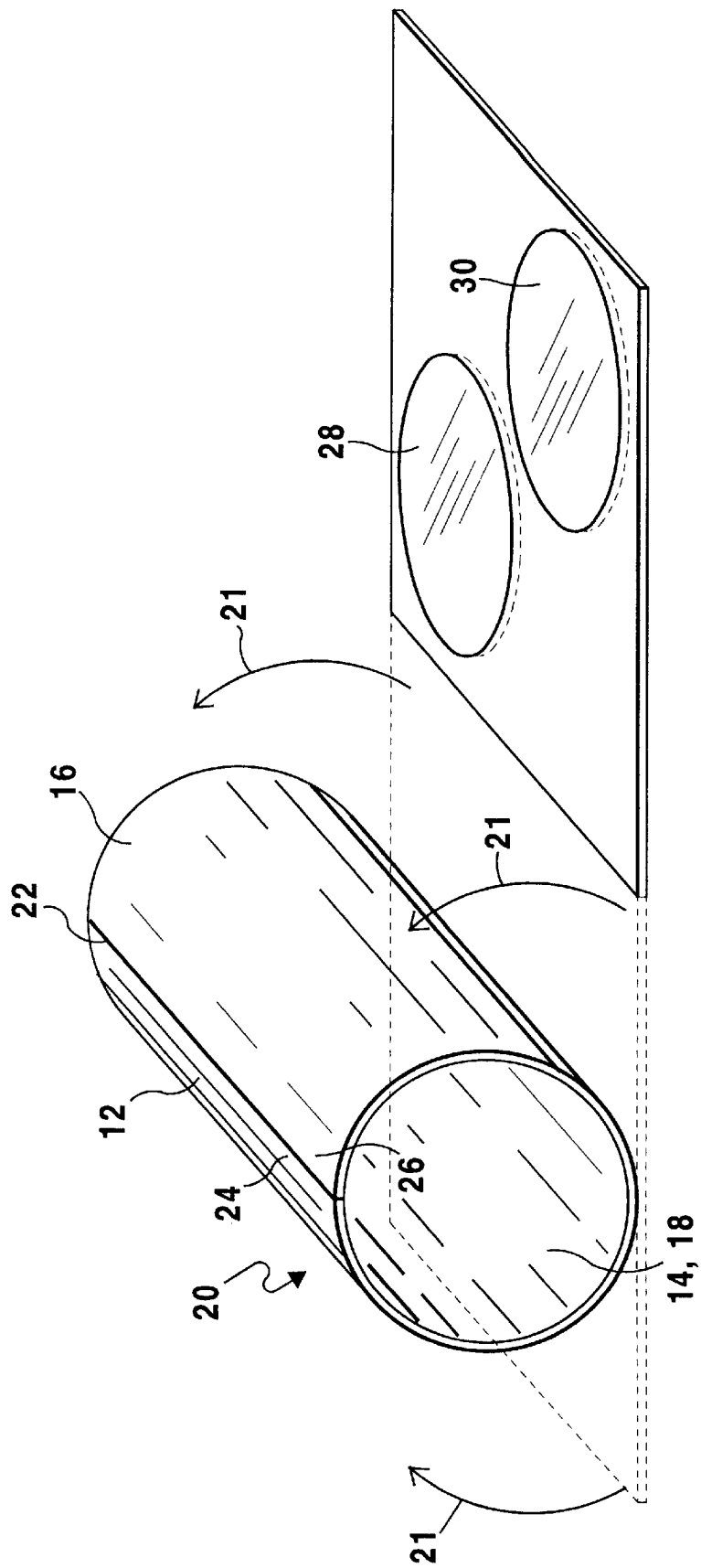
FIG. 4 is a side perspective view illustrating the forming of the cylinder including the reflective inner surface for use with the method and device for producing heat and magnetic field through photon or particle infusion of the present invention.

The flat piece of material 12 is then cut to a preferred size and rolled to form a cylinder 20 as indicated by the arrows labeled 21 in FIG. 4. The material 12 is rolled such that the mirrored surface 18 forms the inner side of the cylinder 20. A seam 22 formed in the cylinder 20 indicates where the first and second ends 24 and 26, respectively, of the material 12 are sealed together. The seam 22 is sealed closed such as by soldering to completely close the side wall of the cylinder 20. A top cover 28 and a bottom cover 30 for the cylinder 20 are formed from a portion of unused material 12. The top and bottom covers 28 and 30 have a circumference substantially equal to the circumference of the cylinder 20. The top cover 28 may be formed with a skirt 43 depending therefrom.

Figure 5:
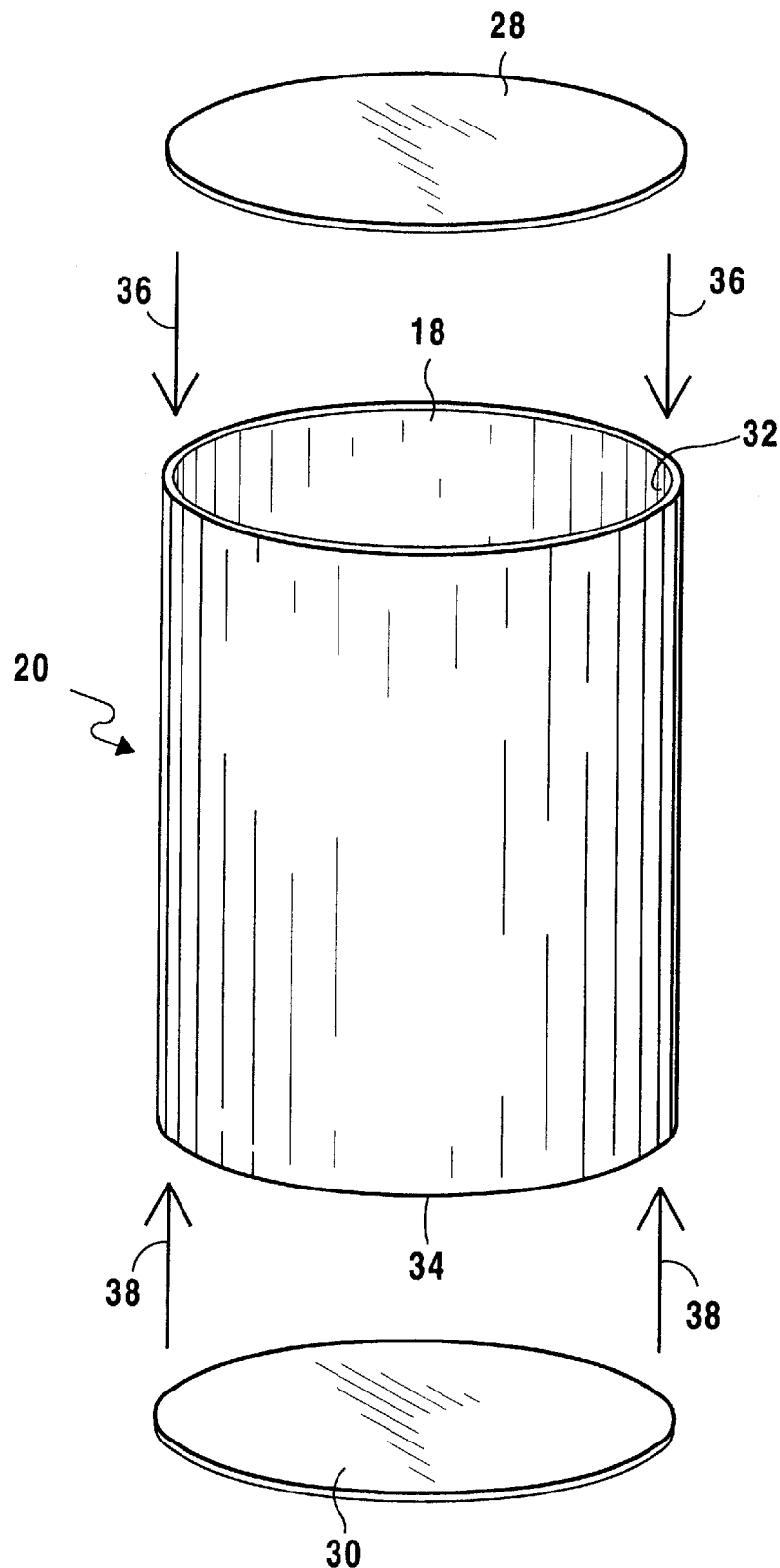
FIG. 5 is a top perspective view of the cylinder for use with the method and device for producing heat and magnetic field through photon or particle infusion of the present invention.

Placement of the top and bottom covers 28 and 30, respectively, to cover the first and second open ends 32 and 34, respectively, of the cylinder 20 is illustrated in FIG. 5. From this view it can be seen that when the flat piece of material 12 is rolled to form the cylinder 12, first and second open ends 32 and 34, respectively, are formed. The top and bottom covers 28 and 30, respectively, are formed from the spare material are positioned to cover the first and second open ends 32 and 34 and thereby seal the cylinder 20. The top cover 28 is positioned to cover the first open end 32 as indicated by the arrows labeled 36 and the bottom cover 30 is positioned to cover the second open end 34 as indicated by the arrows labeled 38.

Figure 6:
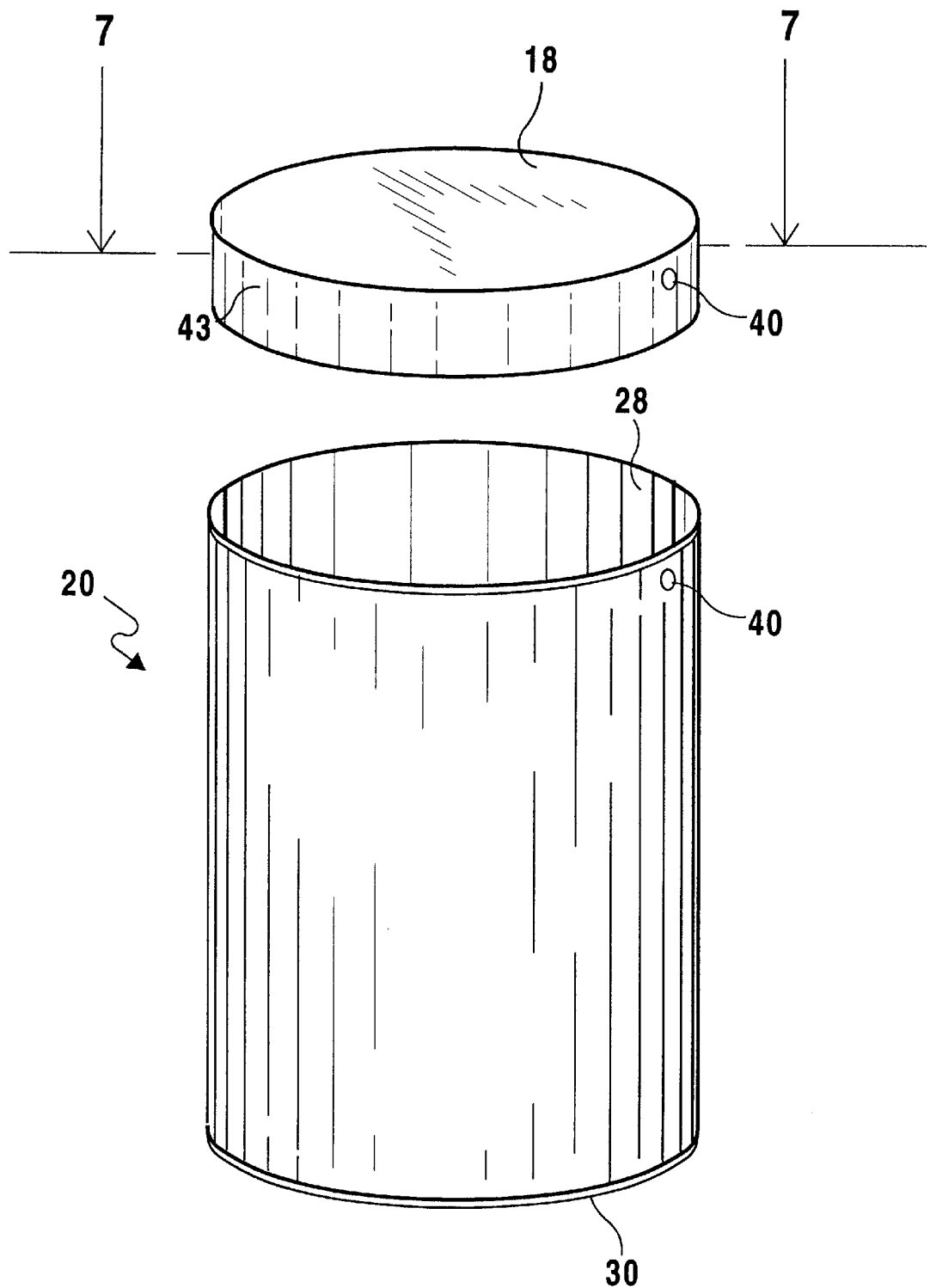
FIG. 6 is a top perspective view illustrating the creation of an orifice in the cylinder for connection with the induction tube for use in the method and device for producing heat and magnetic field through photon or particle infusion of the present invention.
Figure 7:
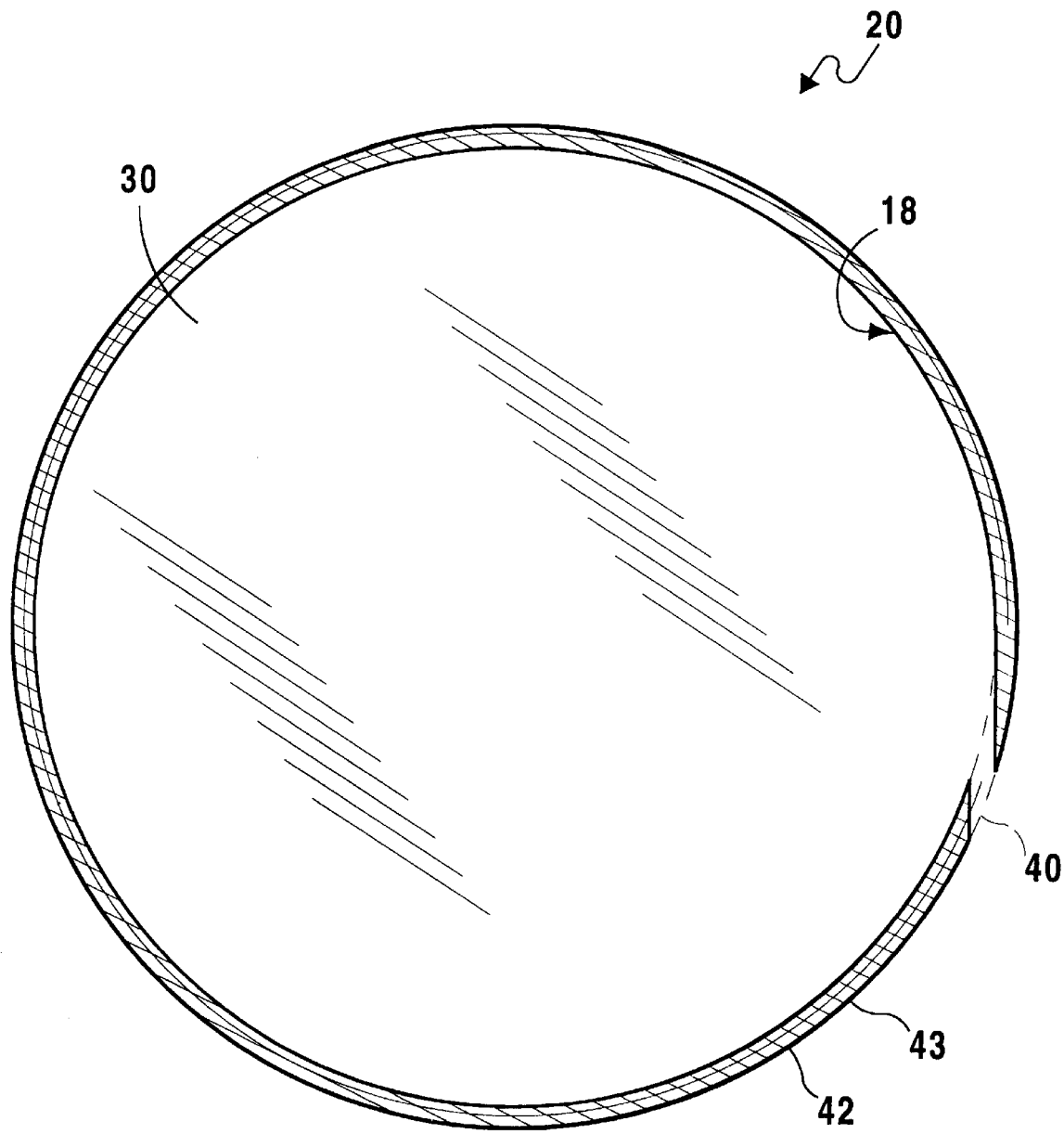
FIG. 7 is a top view of the cylinder including the orifice for use with the method and device for producing heat and magnetic field through photon or particle infusion of the present invention.

An opening 40 is then created in a side of the top cover 28 and top side 32 of the cylinder 20 as illustrated in FIGS. 6 and 7 for introduction of the particle stream forming the laser or particle beam into the cylinder 20. FIG. 6 illustrates a perspective view of the cylinder 20 and top cover 28 while FIG. 7 illustrates a cross-sectional view. The opening 40 is at an angle to the wall 42 forming a skirt 43 extending through the top cover 28 and cylinder 20 so as to be substantially tangential to the wall 42 of both the top cover 28 and the cylinder 20 as is clearly seen in FIG. 7. Alternately, the opening 40 may be formed at a top side of the cylinder 20 adjacent the open first end 32 and below the top cover 28. Forming the opening 40 in this manner controls the direction at which the laser or particle beam will enter the cylinder 20 and thus control the angle of reflection within the cylinder 20.

Figure 8:
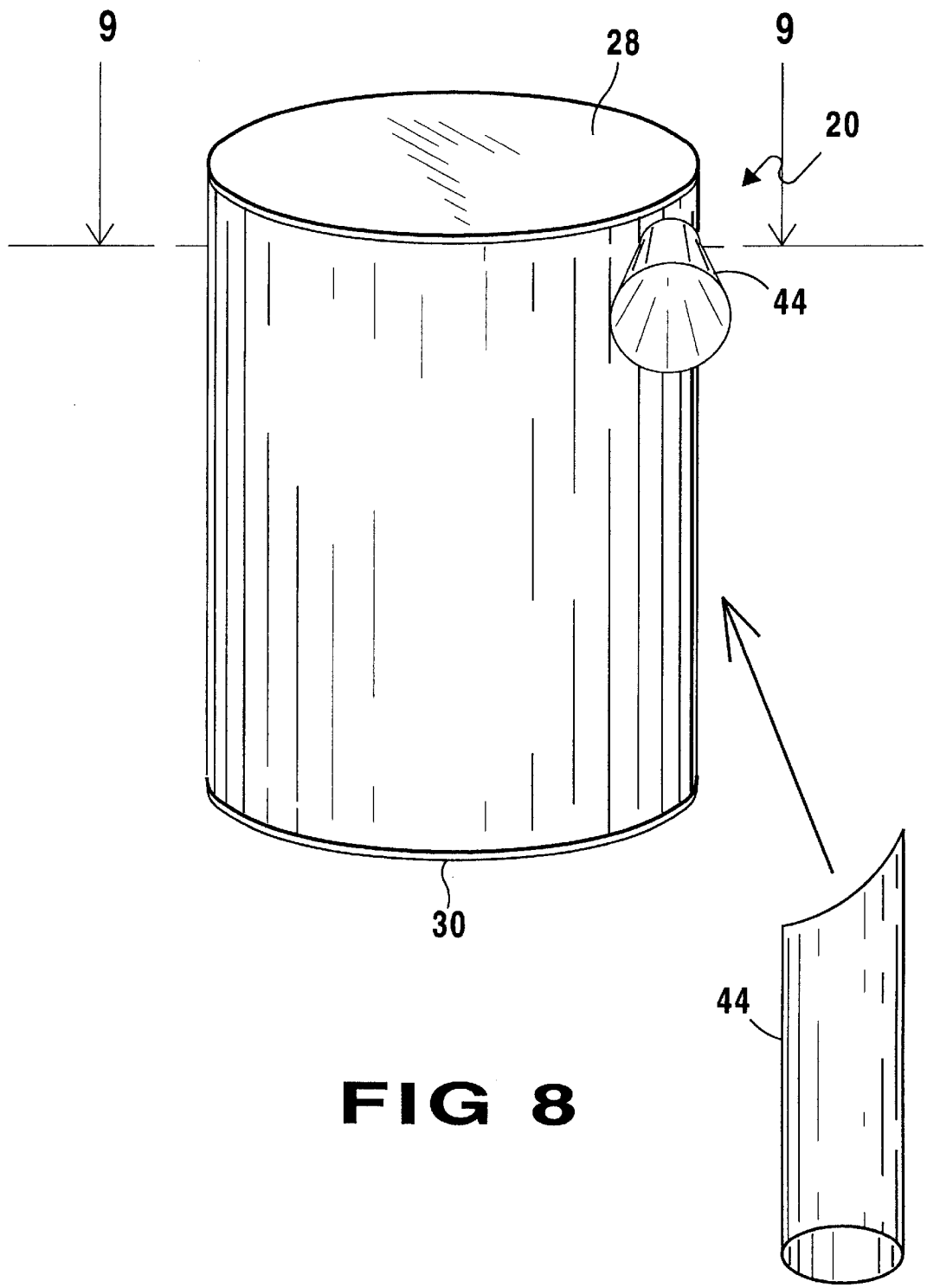
FIG. 8 is a side perspective view of the cylinder and induction tube for use with the method and device for producing heat and magnetic field through photon or particle infusion of the present invention.
Figure 9:
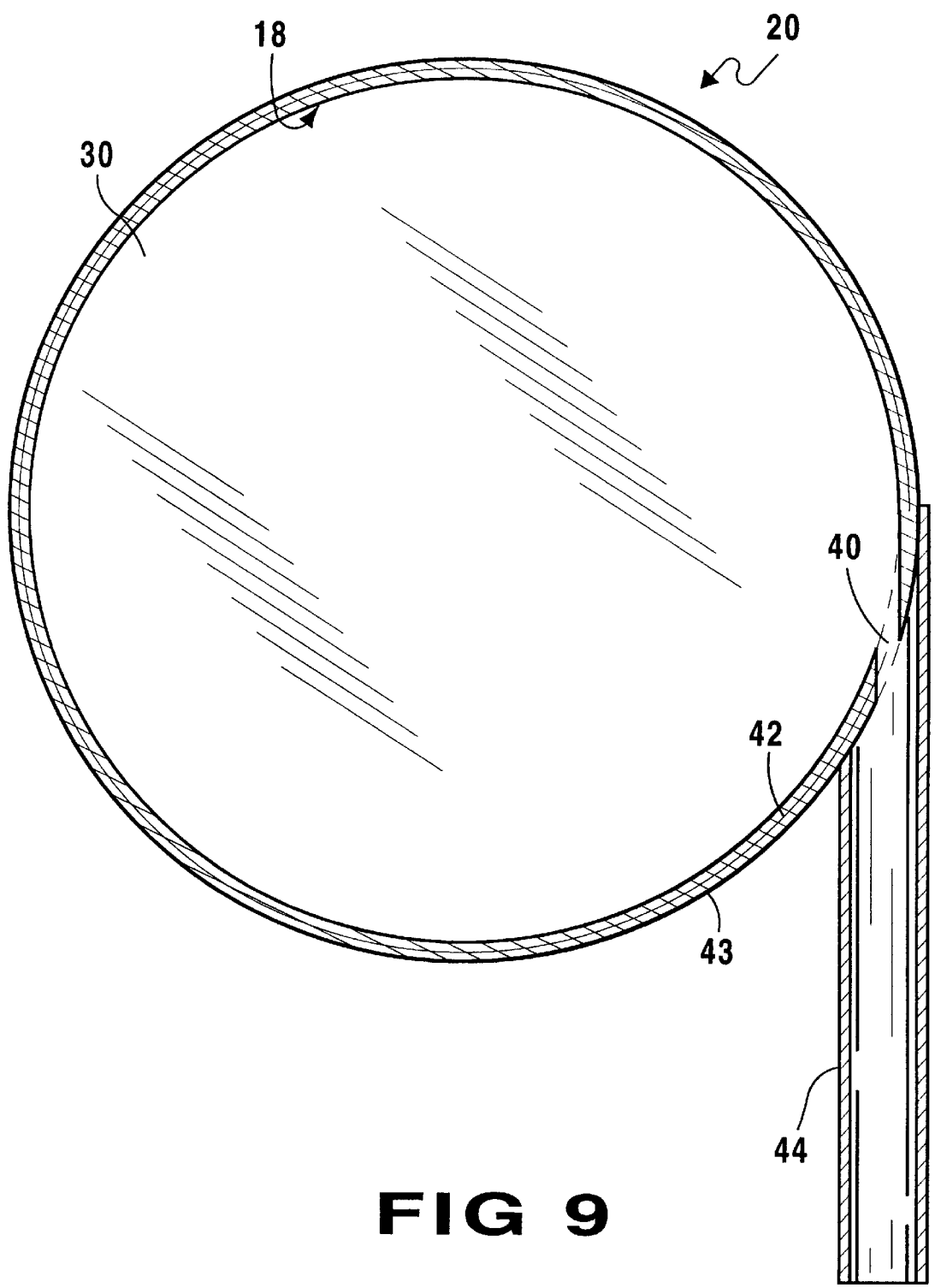
FIG. 9 is a top view of the cylinder and induction tube connected together for use with the method and device for producing heat and magnetic field through photon or particle infusion of the present invention.

An induction tube 44 is then formed and positioned to cover the opening 40 as illustrated in FIGS. 8 and 9. The induction tube 44 is in the form of an elongated chamber providing a path to the opening 40 through which the laser or particle beam will travel. The induction tube 44 may be one of cylindrical and rectangular in shape. The induction tube 44 is connected to the skirt 43 of the top cover 28 or to the top side 32 of the cylinder 20 through either bolts or a weld. Furthermore, the induction tube 44 extends at substantially the same angle to the cylinder wall 42 as the opening 40.

Figure 10:
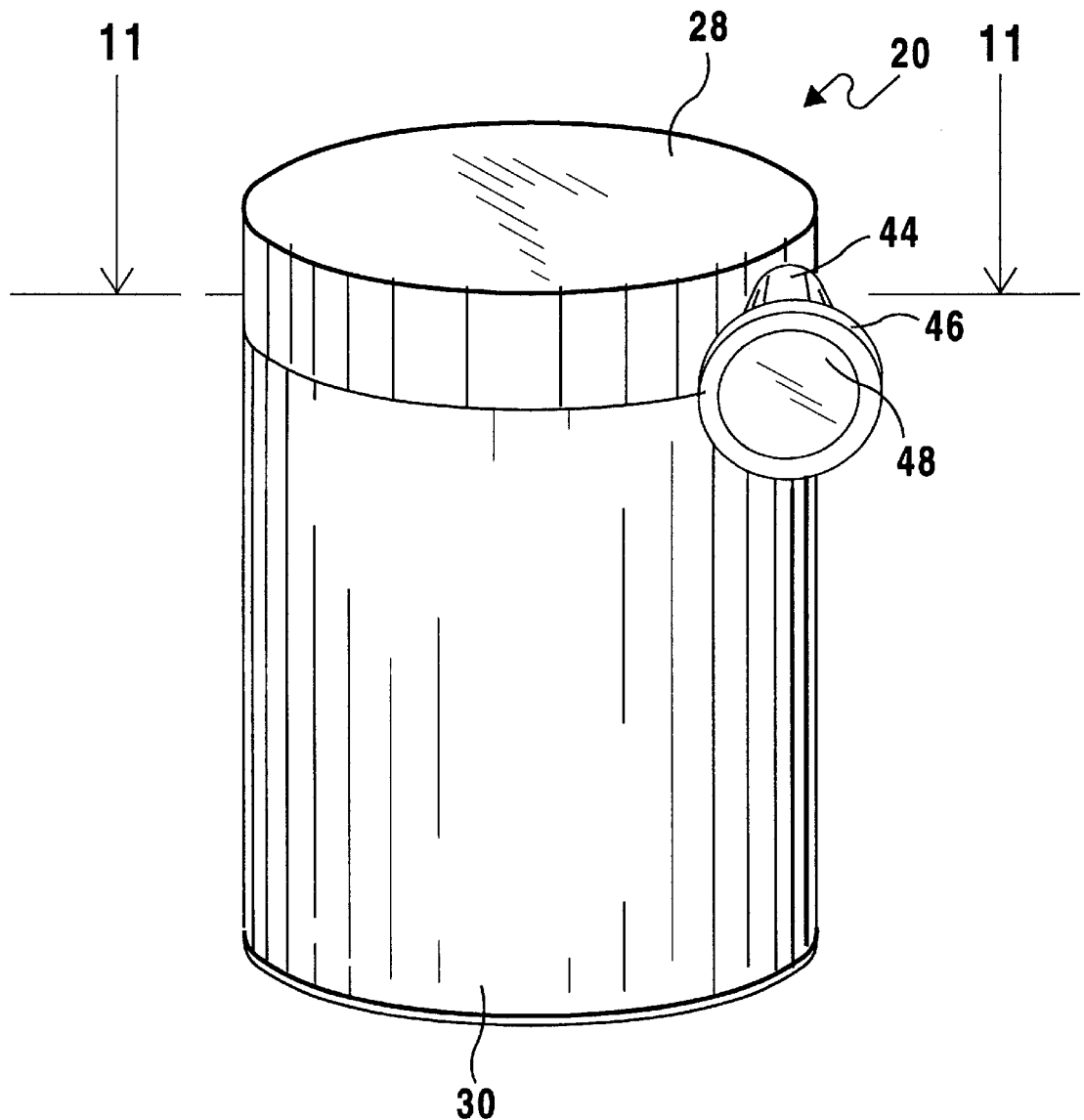
FIG. 10 is a side perspective view of the cylinder and induction tube connected together with a lens positioned at an entrance to the induction tube for use with the method and device for producing heat and magnetic field through photon or particle infusion of the present invention.
Figure 11:
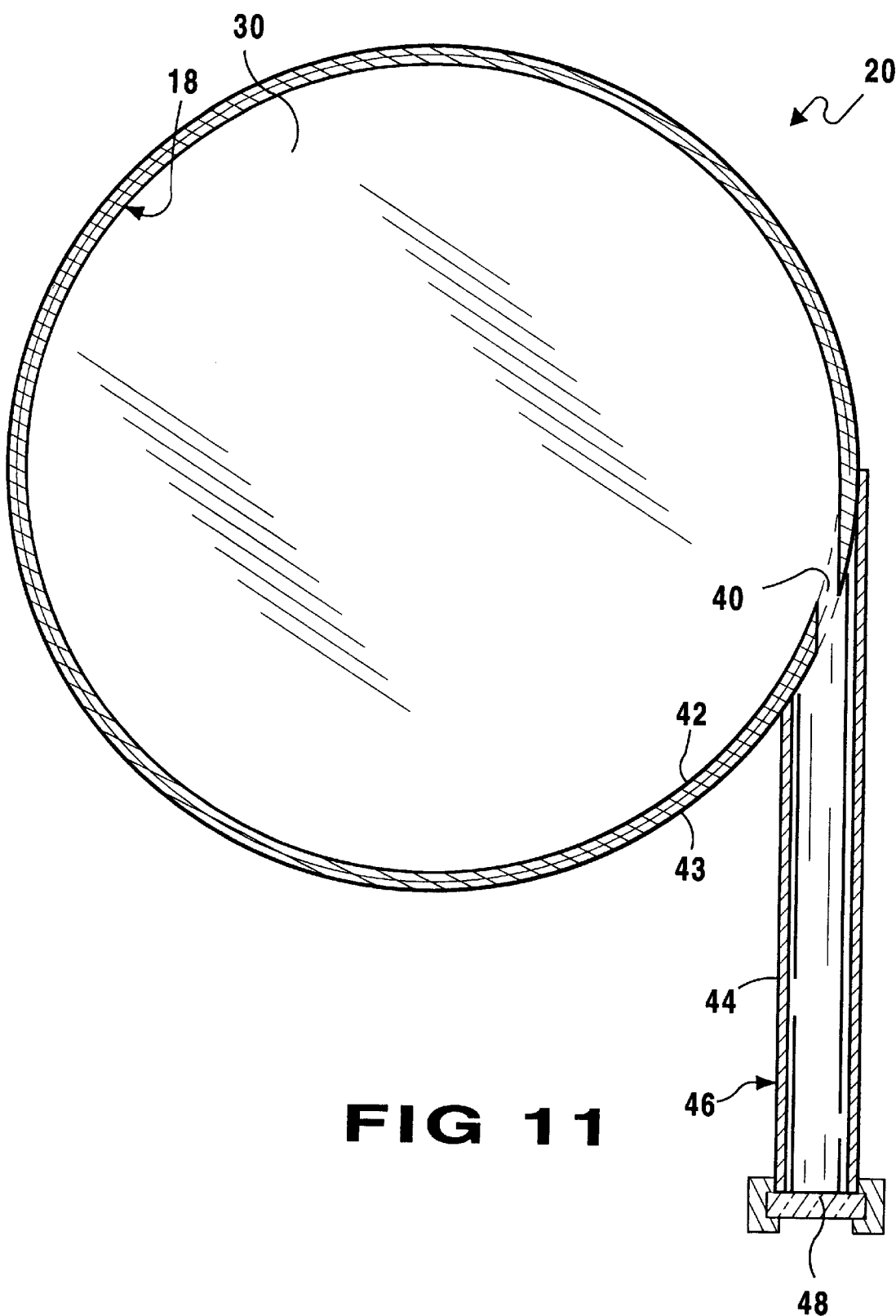
FIG. 11 is a cross-sectional view of the cylinder and induction tube connected together with a lens positioned at an entrance to the induction tube for use with the method and device for producing heat and magnetic field through photon or particle infusion of the present invention taken along the line 11—11 of FIG. 10.

At a first end 46 of the induction tube 44 opposite the connection to the top cover 28 is a lens 48 as is illustrated in FIGS. 10 and 11. The lens 48 is preferably formed of one of quartz, glass and any combination thereof and any material which will close the passageway through the induction tube 44 and provide the path of the photon stream forming the laser or particle beam passing therethrough.

Figure 13:
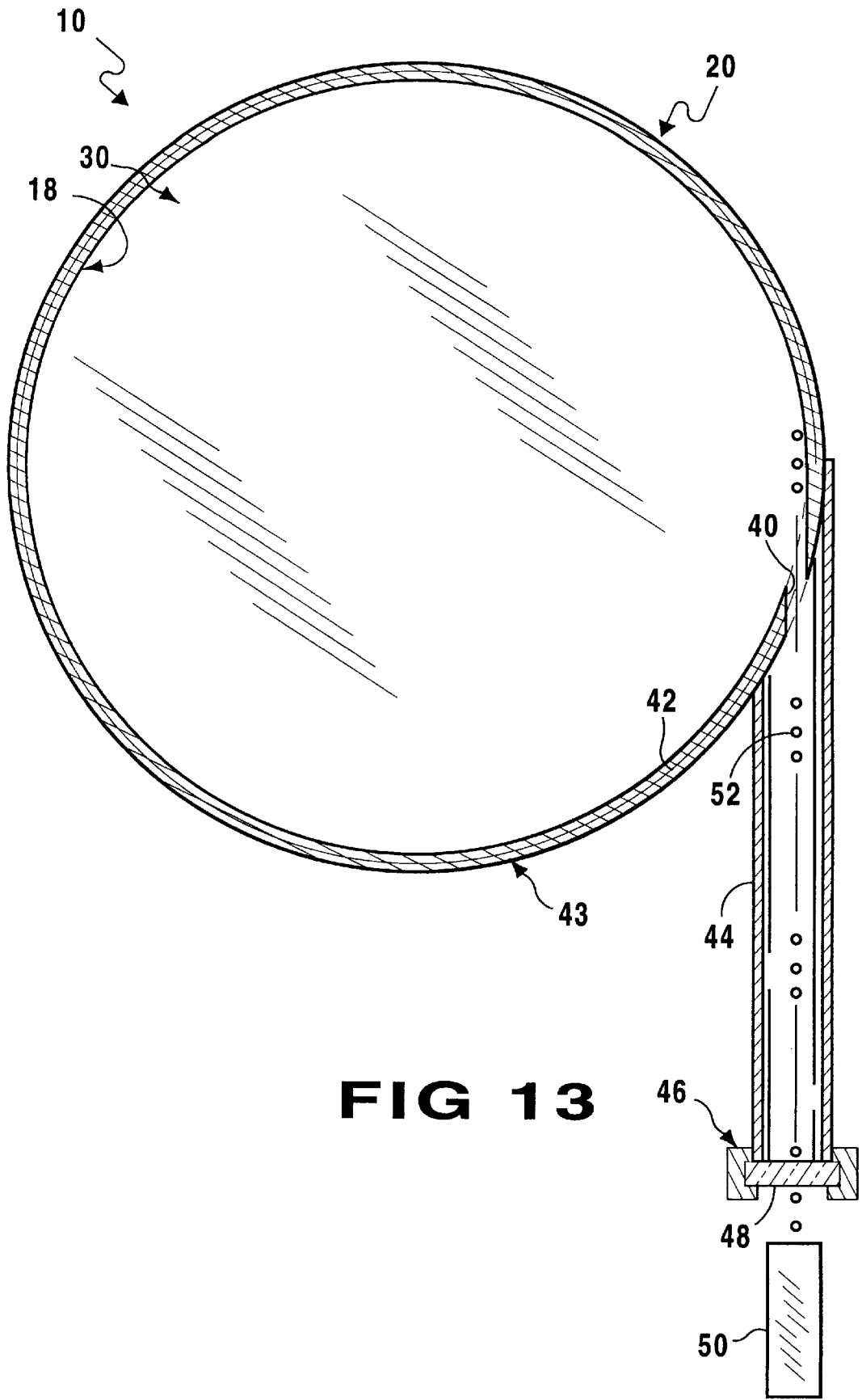
FIG. 13 is a cross-sectional view as shown in FIG. 12 of the method and device for producing heat and magnetic field through photon or particle infusion of the present invention with a stream of photons injected into the induction tube.
Figure 14:
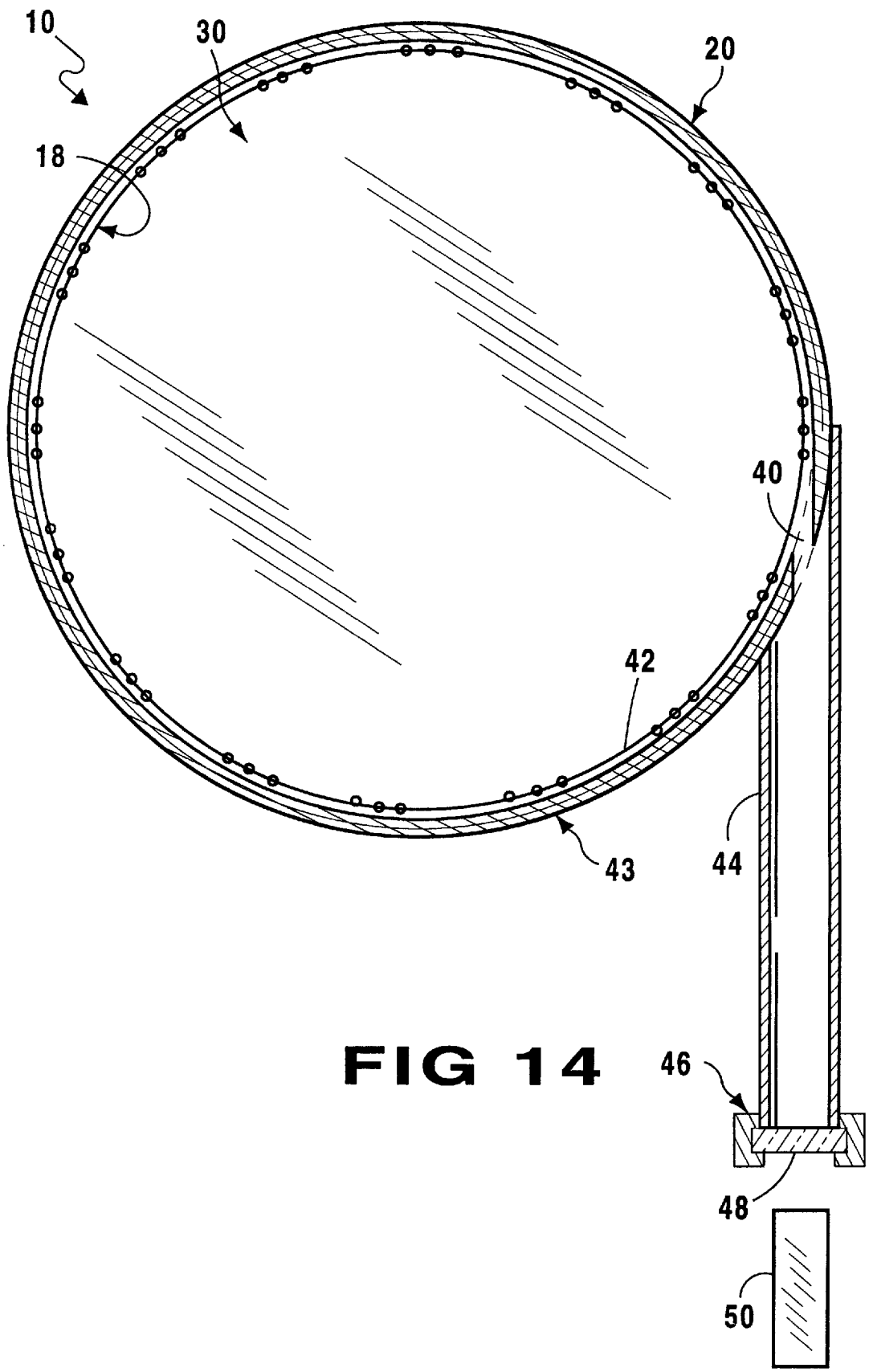
FIG. 14 is a cross-sectional view as shown in FIG. 12 of the method and device for producing heat and magnetic field through photon or particle infusion of the present invention with a stream of photons traveling within the cylinder.

FIGS. 12–15 illustrate positioning of the source 50 of the laser or particle beam positioned outside the lens 48. The source 50 of condensed light forming the laser or particle beam is positioned in front of the lens 48 and outside the induction tube 44. The source 50 is in alignment with the induction tube 44 such that when the laser beam is produced, the photons or particles 52 forming the laser or particle beam will travel through the induction tube 44 through the opening 40 and into the cylinder 20 as illustrated in FIG. 13. The photons or particles 52 will then travel within the cylinder 20 and be reflected within the cylinder 20 against the mirrored surface 18 as illustrated in FIG. 14. The mirrored surface 18 will cause the beam 52 to be reflected back into itself causing the density of photons or particles within the cylinder 20 to increase at an exponential pace thereby greatly increasing the density of photons or particles within the cylinder 20 as illustrated in FIGS. 14 and 15. The increased number of photons or particles 54 will continue to travel within the cylinder 20 being reflected off of the mirrored surface 18 until the source 50 is turned off. The cycled infusion of the photons or particles 54 caused by the reflections off of the mirrored surface will cause the release of energy stored therein in the form of heat. The heat emitted from the photons or particles 54 will be absorbed by the walls of the cylinder 20 through convection and conduction where it may be harvested for use at a later time such as for the production of steam for use in powering a steam turbine engine or for powering an electrical generator to generate electrical energy via energy conversion or magnetic induction.

The source 50 will be turned off upon generation of a desired amount of heat, i.e. obtaining a desired number of photons or particles infusing within the cylinder. The source 50 may then be cycled through an on/off sequence to maintain the amount of heat generated and account for dissipation of heat into the ambient atmosphere.

Alternatively to use of a single source 50 for generation of heat or magnetic field within the cylinder 20, three ports may be used as illustrated in FIG. 16. FIG. 16 shows the use of a vacuum port 56, a bathing gas port 58 and a laserable gas (or quantum fuel) port 60 connected to the induction tube 44. The vacuum port 56 is for connection to a vacuum for removing the air from within the cylinder 20. The bathing gas port 58 is for connection to a supply of bathing gas and the laserable gas (or quantum fuel) port 60 is for connection to a supply of laserable gas. The laserable gas (or quantum fuel) port 60 may be connected to a supply of any one of a source of $CO_2$, helium, neon, argon and any mixture thereof. Furthermore, any other gas or mixture of gases may be used which will immediately release infrared energy upon introduction into the cylinder 20. The infrared energy may then be easily converted to heat within the cylinder walls for the production of steam and eventually the conversion to other forms of energy.

The production and operation of the device for producing heat and magnetic field through photon, particle infusion 10 will now be described with reference to the figures and specifically FIG. 1. In operation, the device for producing heat and magnetic field through photon, particle infusion 10 is produced from a flat piece of material 12 having highly refractive properties as described in step S2. The material 12 used is preferably formed from at least one of metal, glass, ceramic, any metal alloy and any combination thereof. The material 12 has an upper reflective surface 14 and a lower surface 16, the upper reflective surface 14 is polished or coated to form a mirrored surface 18 as stated in step S4.

The flat piece of material 12 is then cut to a preferred size and shaped by rolling to form a cylinder 20. The material 12 is rolled such that the mirrored surface 18 forms the inner side of the cylinder 20 as discussed in step S6. The sides of the material are sealed together by soldering or with bolts to completely enclose the inner side of the cylinder 20. A top cover 28 and a bottom cover 30 for the cylinder 20 are formed from a portion of unused material 12. The top and bottom covers 28 and 30 have a circumference substantially equal to the circumference of the cylinder 20 and are placed to cover the first and second open ends 32 and 34, respectively, of the cylinder 20 covering the first and second open ends 32 and 34 and thereby seal the cylinder 20.

An opening 40 is then created in a side of the top cover 28 and through the cylinder 20 for introduction of the particle stream forming the laser or particle beam into the cylinder 20 as described in step S8. The openings 40 will be aligned with one another thereby creating an entry into the cylinder 20 for the laser beam to pass through. Alternatively, the opening may be positioned at a top side 32 of the cylinder 20 below the top cover 28. The opening 40 is formed to extend at an angle to the wall 42 forming a skirt 43 extending from the top cover 28 so as to be substantially tangential to the wall 42 of both the top cover 28 and the cylinder 20. Alternately, the opening 40 may be formed at a top side 32 of the cylinder 20 adjacent the open first end 32. Forming the opening 40 in this manner controls the direction at which the laser beam will enter the cylinder 20 and thus control the angle of reflection within the cylinder 20.

An elongated chamber having open end sides is then formed to operate as an induction tube 44 as stated in step S10. The induction tube 44 is then attached to the cylinder 20 in a position covering the opening 40 as discussed in step S12. The induction tube 44 is connected to the skirt 43 of the top cover 28 or to the top side of the cylinder 20 through either bolts or a weld. A lens 48 is attached to a first end 46 of the induction tube 44 opposite the connection to the top cover 28 as described in step S14. The lens 48 is preferably formed of one of quartz, glass and any combination thereof and any material and provides an entrance through which an amplified photon stream forming the laser beam can pass into and through the induction tube.

The source 50 of the laser or particle beam is then positioned outside the induction tube 44 and in front of the lens 48 as stated in step S16. The source 50 is then aligned with the induction tube 44 such that when the laser or particle beam is produced, the photons 52 forming the laser or particle beam will travel through the induction tube 44 through the opening 40 and into the cylinder 20 as stated in step S18.

The device for producing heat and magnetic field through photon, particle infusion 10 is now ready for use. The source 50 will now be turned on to create a stream of photons or particles 52 which will travel through the induction tube 44 and into the cylinder as discussed in step S20. The mirrored surface 18 within the cylinder will cause the stream of photons or particles to be reflected within the cylinder 20 against the mirrored surface 18. The mirrored surface 18 will cause the beam 52 to be reflected back into itself causing the density of photons or particles within the cylinder 20 to increase at an exponential pace thereby greatly increasing the density of photons or particles within the cylinder 20 as stated in step S22. The infusion of the photons or particles forming the stream will cause the release of energy stored therein in the form of heat. The heat emitted from the photons or particles 54 will be absorbed by the walls of the cylinder 20 through convection and conduction where it may be harvested for use at a later time such as for the production of steam for use in powering a steam turbine engine or for powering an electrical generator to generate electrical energy via energy conversion as described in step S24.

The source 50 will be turned off upon generation of a desired amount of heat, i.e. obtaining a desired number of photons or particles infusing within the cylinder as discussed in step S26. The source 50 may then be cycled through an on/off sequence to maintain the amount of heat generated and account for dissipation of heat into the ambient atmosphere as stated in step S28.

Alternatively to use of a single source 50 for generation of heat within the cylinder 20, three ports may be used as described in step S30. The three ports used include a vacuum port 56, a bathing gas port 58 and a laserable gas (or quantum fuel) port 60 all being connected to the induction tube 44. The vacuum port 56 is for connection to a vacuum for removing the air from within the cylinder 20. The bathing gas port 58 is for connection to a supply of bathing gas and the laserable gas (or quantum fuel) port 60 is for connection to a supply of laserable gas. The laserable gas port 60 may be connected to a supply of any one of a source of $CO_2$, helium, neon, argon and any mixture thereof. Furthermore, any other gas or mixture of gases may be used which will immediately release infrared energy upon introduction into the cylinder 20. The infrared energy may then be easily converted to heat within the cylinder walls for the production of steam and eventually the conversion to other forms of energy.

From the above description it can be seen that the method and device for producing heat and magnetic field through photon, particle infusion of the present invention is able to overcome the shortcomings of prior art devices by providing a method and device for producing heat and magnetic field through photon, particle infusion which is able to generate heat by converting the energy stored in a laser beam, the heat produced by the laser beam being used to produce steam or generate electrical energy. The method and device for producing heat through photon-positron or particle infusion directs the laser beam through an induction tube and into a cylinder having a reflective inner side which causes the laser beam to reflect back into itself creating a high concentration of photons or particles within the cylinder. The method and device for producing heat through particle infusion provides for the laser or particle beam to continually reflects back against the walls of the cylinder thereby causing the photon or particle population to multiply, the multiplication of the photon population increasing the photon density within the cylinder and creating intense heat. Furthermore, the method and device for producing heat through photon/particle infusion of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A device for producing heat and magnetic field through photon, positron or particle infusion, said device comprising:
   a) a sealed cylinder including a side wall having a mirrored inner side and a recess extending through and tangentially to said side wall providing access to said inner side of said cylinder;
   b) an induction tube connected to and extending from said side wall for providing a passageway for a stream of particles to said recess; and c) a source of said stream of particles positioned at an end of said induction tube opposite said connection with said cylinder wherein said source directs said stream of photons through said induction tube and recess into said cylinder in which said source of particles is reflected off said mirrored inner side thereby causing said particles in said stream to collide and release heat.

2. The device as recited in claim 1, further comprising a lens positioned at an end of said induction tube opposite said connection to said cylinder wherein said lens amplifies said stream of particles passing therethrough and into said induction tube.

3. The device as recited in claim 2, wherein said lens is formed from one of quartz, glass and any combination thereof.

4. The device as recited in claim 1, wherein said cylinder is formed from a refractive material.

5. The device as recited in claim 4, wherein said refractive material is one of metal, any metal alloy, glass, ceramic material and any combination thereof.

6. The device as recited in claim 1, wherein said induction tube is one of cylindrical and rectangular.

7. The device as recited in claim 1, wherein said induction tube is connected to said cylinder by one of bolting or welding.

8. The device as recited in claim 1, wherein said stream of particles is formed of photons.

9. The device as recited in claim 1, further comprising a port for connection of a vacuum connected to said induction port.

10. The device as recited in claim 9, further comprising a port for the connection of a supply of bathing gas connected to said induction port.

11. The device as recited in claim 10, further comprising a port for the connection of a supply of a laserable gas connected to said induction port.

12. The device as recited in claim 11, wherein said supply of laserable gas is one of $CO_2$, helium, neon, argon, any gas able to immediately release infrared energy upon colliding with other particles and any combination thereof.

13. A method of producing heat or a magnetic field through photon, positron or particle induction, said method comprising the steps of:

a) activating a source of a stream of particles to generate the stream of particles;

b) directing the stream of particles through an induction tube for entry into a sealed cylinder having a mirrored inner surface;

c) reflecting the stream of particles off the mirrored surface upon entry into the cylinder thereby causing the particles to infuse with each other and release heat stored therein; and d) harnessing the heat released by the infusing particles for future use.

14. The method as recited in claim 13, further comprising the step of passing the stream of particles through a lens at an entry to the induction tube for amplifying the stream of particles.

15. The method as recited in claim 13, further comprising the step of deactivating the source of the stream of particles upon harnessing a desired amount of heat.

16. The method as recited in claim 15, further comprising the step of reactivating the source of the stream of particles upon dissipation of the harnessed heat into the atmosphere to a level below the desired amount of heat.

17. The method as recited in claim 16, further comprising the step of using the harnessed heat to heat water and thereby produce steam and using the harnessed magnetic field to produce electricity through magnetic induction.

18. The method as recited in claim 17, further comprising the step of activating a steam turbine with the steam produced by heating water.

19. The method as recited in claim 16, further comprising the step of converting the harnessed heat into electrical energy.

* * * * *